United States Patent
Delmas et al.

[15] 3,695,764
[45] Oct. 3, 1972

[54] AUTOMATIC SPECTROPHOTOMETRIC ABSORPTION ANALYZER

[72] Inventors: Pierre Delmas, La Soubeyranne E5, 07 Bourg St. Andeol; Pierre Imbert, Chemin des Galettes, 84 Orange, both of France

[22] Filed: Dec. 1, 1970

[21] Appl. No.: 93,941

[30] Foreign Application Priority Data

Dec. 5, 1969 France..................6942150

[52] U.S. Cl. ............356/97, 235/151.35, 250/226, 356/51, 356/100
[51] Int. Cl..........G01j 3/42, G01n 21/04, G01j 3/12
[58] Field of Search......250/43.5 R, 226; 356/51, 74, 356/86, 100, 180, 201; 235/151.35

[56] References Cited

UNITED STATES PATENTS 3,563,656 2/1971 Helms......................356/100
2,735,330 2/1956 Polster.....................356/86
3,334,537 8/1967 Beattie.....................356/86

OTHER PUBLICATIONS

" Instruments for Clinical Chemistry Labs" C & EN Dec. 9, 1963 pg. 118–119

Primary Examiner—Ronald L. Wibert
Assistant Examiner—Vincent P. McGraw
Attorney—Cameron, Kerkam & Sutton

[57] ABSTRACT

An automatic spectrophotometric absorption analyzer for continuous determination of a plurality of components of a fluid sample, comprising a monochromator with a diffraction grating receiving the light transmitted by a vessel with transparent faces which contains said sample, a photoelectric converter so arranged that the light beam emerging from the monochromator falls on its sensitive element, a unit for determining cyclically a plurality of stop positions of said diffraction grating which define wavelengths corresponding to the absorption lines of components of said sample, and means for automatic computation of the concentration of said components from the signal which is delivered by the converter.

5 Claims, 1 Drawing Figure

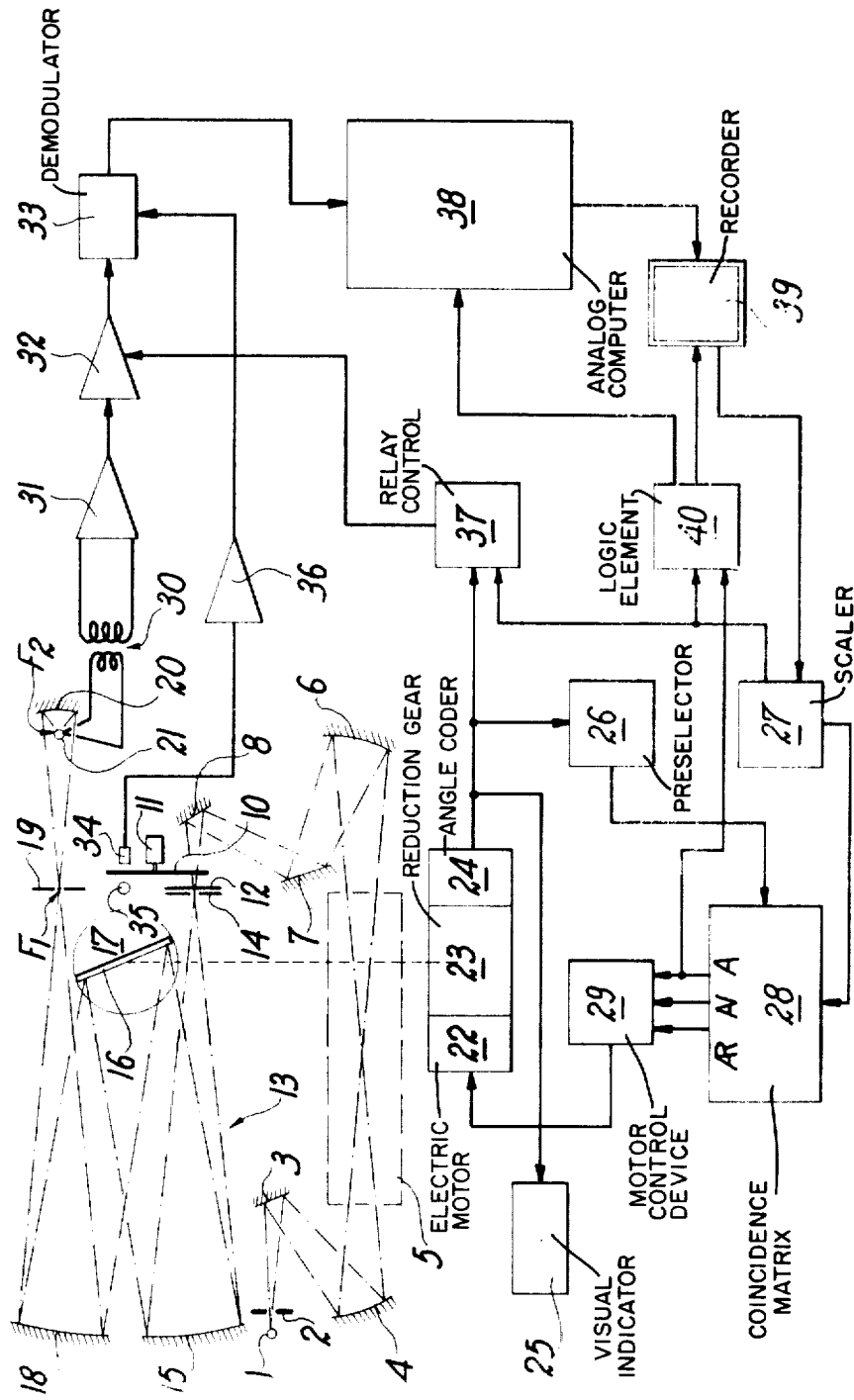

AUTOMATIC SPECTROPHOTOMETRIC ABSORPTION ANALYZER

This invention relates to an automatic analyzer which operates on the principle of absorption spectrophotometry and especially in the infrared region of the spectrum for carrying out continuous quantity determination of a number of components of a fluid sample. This analyzer finds an important although non-limitative application in the determination of small quantities of fluorinated compounds such as $ClO_3F$, $COF_2$, $UF_6$, $SiF_4$ and $ClF_3$ in nitrogen.

In French Pat. No. 1,388,403 applied-for on July 10th 1962 and also in its first certificate of Addition No. 91,269 applied-for on Nov. 28th 1966, there was described a spectrophotometer for determining the concentration in a fluid sample of a compound which exhibits at least one absorption line. This instrument comprises an optical system for producing a light beam, a vessel having transparent faces which is intended to contain said sample and is placed on the path of said beam, a monochromator for selecting a first wavelength corresponding to an absorption line of the sample and at least one second wavelength which does not correspond to an absorption line, a device for modulating the light intensity of the beam at a predetermined frequency, a photoelectric converter for receiving the light beam which is transmitted by said monochromator to the photosensitive element of said converter, a two-channel amplifier system which is tuned to said predetermined frequency and receives the output signal of said converter, a device for operating the monochromator at any particular frequency in order to carry out the alternate selection of the first wavelength and second wavelength, a synchronization device which operates in alternate sequence in order to activate one of the amplifier channels while blocking the other in synchronism with the selection of the first wavelength and second wavelength, and a system which is supplied by the two amplifier channels and establishes the ratio of the signals received in order to determine the optical density of the sample in respect of the absorption line considered. The concentration $C$ % to be determined is accordingly obtained by application of the formula :

$$C\% = 100 \, (K \, D/P)$$

wherein $K$ is a constant in respect of the compound considered at the wavelength to be analyzed, $D$ is the optical density of the sample in respect of said wavelength and $P$ is the pressure within the analytical vessel.

The present invention proposes an improved form of construction of said spectrophotometer which permits continuous determination in a fluid sample not of one component along but of practically all the components of said sample. In fact, the analyzer as thus constructed supplies the values of the concentrations of eleven components but provision could be made for a larger capacity without entailing any technical difficulty.

More specifically, the invention is directed to a spectrophotometric absorption analyzer for continuous determination of a plurality of components of a fluid sample and comprising :

a light source, a vessel with transparent faces which contains said sample and is placed on the path of the light emitted by said source, a device for modulating at a predetermined frequency the intensity of the light beam transmitted by said vessel, a monochromator comprising a diffraction grating which receives the light transmitted by the vessel, a photoelectric converter so arranged that the light beam emerging from the monochromator falls on the sensitive element of said converter, an amplifying system to which the alternating-current output signal of said converter is applied, a demodulating circuit connected to the output of said amplifying system in order to deliver a direct-current signal whose level is proportional to the intensity of the light beam transmitted by the vessel at the wavelength which is determined by the monochromator, said analyzer being mainly characterized in that it further comprises :

an assembly for automatically controlling the position of said diffraction grating in order to determine cyclically N stop positions defining N wavelengths having different predetermined values of which $N - 1$ wavelengths referred-to as measuring wavelengths correspond to the absorption lines of $N - 1$ components of the sample and of which the last wavelength referred-to as the reference wavelength does not correspond to any of said absorption lines, and means for automatic computation from the signal which is delivered by the demodulating circuit in respect of each stop position of the diffraction grating which defines a measuring wavelength and from the same signal which is delivered when the stop position of the grating defines the reference wavelength and which is stored during each cycle in order to determine the optical density of the sample at said measuring wavelength and the concentration of the component which corresponds to said wavelength.

Further characteristic features of this invention will become apparent from the following description in which one embodiment of said analyzer is given by way of example and not in any sense by way of limitation.

As shown in the single accompanying FIGURE, an automatic spectrophotometric absorption analyzer in accordance with the invention has an optical portion which comprises the following elements :

an infrared radiation source 1 preferably consisting of a ceramic rod which is heated to incandescence (1,200° C.) and emits a continuous energy spectrum in the wavelength band between 2.5 and 25 microns ; the energy emitted by said source falls off very rapidly in the vicinity of the high wavelength values (it accordingly follows, for example, that the luminance of the source is divided by two when the wavelength increases from 12.75 to 14.5 microns) ;

a diaphragm 2 which is placed in front of the source 1 and limits the divergence of the beam which is emitted by this latter ; said diaphragm is advantageously mounted together with the source 1 on an orientable cradle which is not illustrated ;

a plane mirror 3 which receives the divergent beam from the source 1, said beam being limited by the diaphragm 2;

a concave spherical mirror 4 for focusing the beam which is reflected from the mirror 3;

an analytical vessel 5 limited by two plane windows formed of material which is transparent to infrared radiation such as silver chloride; the fluid to be analyzed circulates within said vessel which is placed on the path of the light emitted by the mirror 4 and this latter provides a real image of the filament of the source 1 which is located half-way between the two windows of said vessel;

a concave spherical mirror 6 for receiving the beam which has passed through the fluid sample contained in the vessel 5 and for which the image of the filament provided by the mirror 4 serves as real object;

two plane mirrors 7 and 8 for reflecting the light derived from the spherical mirror 6;

a device for modulating the intensity of the beam which is reflected from the plane mirror 8; said device is made up of a disc 10 having two opposite blades and driven by a synchronous motor 11 at the speed of five revolutions per second, thereby carrying out a modulation at a frequency of 10 cps (cycles per second);

an interferential filter 12 placed on the path of the modulated beam in order to stop radiations having a wavelength which is lower than 7.2 microns and higher than 15 microns;

a monochromator 13 of the Ebert-Fastie type comprising elements which define for the light transmitted by the filter 12 an entrance slit 14 in whose plane the spherical mirror 6 forms a real image of the filament of the source 1, a first spherical concave mirror 15 in the focal plane of which is located the entrance slit 14, an echelette diffraction grating 16 having a coarse groove spacing and mounted on a rotary circular support 17, the engraved surface of said grating being just covered by the parallel beam reflected from the mirror 15, a second spherical concave mirror 18 which is identical with the mirror 15 and placed symmetrically with said mirror relative to the optical axis of the system and elements which define for the beam reflected from the mirror 18 an exit slit 19 located in the focal plane of said mirror, the image of the entrance slit 14 being thus formed in the plane of said exit slit;

an elliptical mirror 20 for receiving the emergent beam from the slit 19 which is disposed in its focal plane $F_1$;

finally, a photoelectric converter 21 consisting of a thermocouple, the photosensitive element of which is located in the focal plane $F_2$ of the elliptical mirror 20; the image of the exit slit 19 which constitutes the image of the filament of the source 1 as defined by the diaphragm 2 is placed exactly over said photosensitive element.

If D designates the angle made between the axes which join the center of the diffraction grating 16 to the center of the focusing mirrors 15 and 18 and $\alpha$ designates the angle made between the line at right angles to the plane of said diffraction grating and the plane of symmetry of the monochromator 13, a light beam having a wavelength $\lambda$ and passed to the diffraction grating at an angle of incidence $i$ is diffracted at an angle $r$ in accordance with a law defined by the formula:

$$\sin i + \sin r = k n \lambda,$$

wherein $k$ represents the order of diffraction employed and $n$ represents the number of lines per millimeter of the grating. In fact, since we have:

$$i = \alpha - (D/2)$$

and $$r = \alpha + (D/2),$$

we may write:

$$\sin \alpha = \frac{kn\lambda}{2 \cos \frac{D}{2}}$$

Thus, a value of the wavelength of the light radiation emanating from the monochromator 13 corresponds to each value of the angle $\alpha$. In order that it may be possible to determine by means of the optical portion described the concentration in the fluid sample contained in the vessel 5 of 11 of the sample components which are each defined by an absorption line (as is the case with the analyzer which is constructed according to the invention), it is therefore only necessary:

1. to establish 12 positions of the grating 16, namely 12 values of the angle $\alpha$ which define on the one hand 11 wavelengths or so-called measuring wavelengths each corresponding to the absorption line of one of the eleven components and on the other hand a reference wavelength which does not correspond to any of the absorption lines,
2. then to establish the ratio of the electrical signals delivered by the converter 20 in respect of each of the eleven measuring wavelengths to the signal obtained in the case of the reference wavelength; said eleven ratios representing the transmission of the sample at the eleven selected wavelengths accordingly make it possible to obtain the concentration values which are sought.

The 12 operating positions of the diffraction grating 16 are determined by means of an automatic cyclic control unit which comprises the following elements:

an electric motor 22 having very low inertia and having a high damping torque;

a reduction-gear unit 23 with means for taking-up play and driven by the motor 22, the circular support 17 being driven in rotation by said unit about the axis of this latter which coincides with the center of the diffraction grating 16;

an angle coder 24, the shaft of which is connected to the shaft of the reduction-gear unit 23 by means of a bellows-type coupling element in order to absorb possible misalignment; said coder continuously delivers to a four-decade register a four-digit number which defines the angular position of the grating 16, that is to say the value of the angle $\alpha$ as hereinabove defined; a display device 25 provides a visual indication of said number;

a system 26 for preselecting the twelve operating positions of the diffraction grating 16 and comprising twelve groups of four switches which are connected in parallel to the four decades of the coder 24 and on each of which is indicated a number defining one angular operating position of the grating, 12 AND gates having four inputs each associated with one of the 12 groups of four switches and 12 serially arranged storage flip-flops each connected to the output of one of the 12 AND gates ; when coincidence occurs between the four-digit number which appears at the output of the angle coder 24 and one of the twelve numbers indicated on a group of switches, the logic level 0 appears at the output of the corresponding AND gate and said level turns-on the storage flip-flop which is connected to the output of said gate; said flip-flop is turned-off when the following flip-flop is turned-on;

a scaler 27, the one-step forward displacement of which is initiated on completion of processing of the measurement in the previous position and which defines the serial number of each stop position of the grating 16; when twelve different wavelengths are utilized as in the analyzer herein described, said scaler returns automatically from state 12 to state 1; however, this return can take place from any state, thereby permitting the possibility of working with a number of wavelengths which is lower than 12;

a coincidence matrix 28 to the inputs of which are connected the N flip-flops of the preselecting systems 28 as well as the scaler 27; said matrix has three outputs which are designated in the figure by the reference letters A, AV and AR at which a logic signal 1 appears, depending on whether it is necessary to initiate respectively the stopping of the motor 28, the forward running or the reverse running of said motor; the signal which initiates stopping of the motor appears when coincidence occurs between the number indicated by the scaler 27 and the serial number of the set flip-flop; the signal which initiates forward running corresponding to rotation of the grating 16 in the direction of scanning of wavelengths from position No. 1 to position N is delivered if the scaler 27 indicates a number which is different from 1 and if the serial number of the set flip-flop is lower by one unit than the number indicated by said scaler; finally, the signal which initiates reverse running corresponding to rotation of the grating 16 in the direction of direct return from position N to position No. 1 appears if the scaling circuit 27 indicates the digit 1 and if the serial number of the set flip-flop is different from 1;

finally, a device 29 for controlling the motor 22 and comprising a switch for defining the direction of rotation of said motor, the three outputs of the coincidence matrix 28 being connected to said device.

The alternating-current signal having a frequency of 10 cps which is produced by the thermocouple 21 and the maximum amplitude of which is of the order of 1 microvolt must be considerably amplified before it can be processed. To this end, the signal is first subjected to a step-up transformer 30, then fed into a preamplifier 31 constituted by a low-noise matching input stage which employs a miniature triode known by the name of Nuvistor triode and at the output of which are placed successively two active band-pass filters which are centered on 10 cps, an active band-stop filter which is centered on 50 cps and then two further active band-pass filters which are centered on 10 cps. The signal which is modulated at a frequency of 10 cps and derived from said preamplifier is amplified in power in an amplifier 32 which is constituted by a first stage provided with gain adjustment followed by a phase-shifting stage and, in order to drive the primary winding of its output transformer, by a so-called Darlington circuit. In order to take into account substantial variations in level of the processed signal arising from fast decay of the energy emitted by the source 1 in the long-wavelength region, said power amplifier makes use of a relay which is controlled as a function of the position of the diffraction grating 16 (in accordance with a process which will be described hereinafter). Said relay serves to switch an input-signal divider in respect of wavelengths corresponding to high energies and to transmit the entire input signal in the case of wavelengths corresponding to low energies.

The amplified signal is introduced into a synchronous demodulator 33 which, for the purpose of synchronization, also receives a reference signal at a frequency of 10 cps as delivered by a photodiode 34 which is illuminated by a lamp 35 ; said photodiode and said lamp are placed in oppositely facing relation on each side of the rotary disc 10. Before being fed into the demodulator 33, said reference signal passes through an amplifier 36 comprising three low-pass shaping cells followed by a selective amplifying stage constituted by a double-T filter which is centered on 10 cps and mounted for negative feedback on a two-stage amplifier. The reference signal which is delivered is a sine signal at a frequency of 10 cps. There is collected at the output of the demodulator 33 a direct-current voltage whose level is proportional to the luminous intensity of the beam which is focused on the photoelectric converter 21.

The device for controlling the relay which initiates a change of gain of the power amplifier 32 is shown at 37; said device is composed of a storage flip-flop and a set of four switches on which is indicated that angular position of the grating in which the changeover is to take place. The pulse arising from the transition of the coder 24 to the position indicated turns-on said flip-flop and this latter operates the gain-change relay ; the return of the grating to position No. 1 as indicated by the scaler 27 turns-off said flip-flop.

An analog computer 38 comprising operational amplifier circuits determines for each of the eleven positions of the grating which define a measuring wavelength and cause a voltage V to appear at the output of the demodulator 33:

1. the optical density D of the sample at the wavelength considered by performing the operation :

$$D = \log(V_o/V)$$

wherein $V_o$ represents the output voltage of the demodulator 33 in the grating position which defines the reference wavelength corresponding to the absorption line of none of the eleven components under analysis; this voltage is stored and readjusted each time the grating moves to said position, that is to say once per measuring cycle.

2. the concentration $C\%$ in the sample of the component under analysis by performing the operation :

$C\% = (KD/P)\ 100$, wherein $P$ represents a voltage delivered by a pressure transducer (not shown) which is placed on the vessel 5 and $K$ represents a coefficient corresponding to the component under consideration. The values of these coefficients in the case of the 11 components are fed into the computer by means of relays.

The results supplied by the computer 38 are collected by a recorder 39 having a plurality of switchable channels which, after each processing operation, initiates the forward displacement of the scaler 27 by one step.

The logic signal for automatic stopping of the diffraction grating 16 in each predetermined position (produced by the coincidence matrix 28) initiates an internal process controlled by a logic element 40, the two main functions of which are:

to select according to the serial number indicated by the scaler 27 the relays which serve to feed into the computer the different values of the coefficients $K$, and to deliver either a signal which initiates storage of the voltage $V_o$ or a signal for triggering and switching of the recorder 39.

It is naturally possible to connect a digital-analog converter to the output of the computer in order that the results can be processed by a printer, a punched-card system or even a digital computer.

It is apparent that this invention is not limited solely to the embodiment which has been described with reference to the accompanying drawing and that the scope of this patent also extends to alternative forms of either all or part of the arrangements described which remain within the definition of equivalent means as well as to any application of such arrangements.

What we claim is:

1. An automatic spectrophotometric absorption analyzer for continuous determination of a plurality of components of a fluid sample and comprising:

a light source, a vessel with transparent faces which contains said sample and is placed on the path of the light emitted by said source, a device for modulating at a predetermined frequency the intensity of the light beam transmitted by said vessel, a monochromator comprising a diffraction grating which receives the light transmitted by the vessel, a photoelectric converter so arranged that the light beam emerging from the monochromator falls on the sensitive element of said converter, an amplifying system to which the alternating-current output signal of said converter is applied, a demodulating circuit connected to the output of said amplifying system in order to deliver a direct-current signal whose level is substantially proportional to the intensity of the light beam transmitted by the vessel at the wavelength which is determined by the monochromator, a unit for automatically controlling the position of said diffraction grating in order to determine cyclically N stop positions defining N wavelengths having different predetermined values of which $N-1$ wavelengths referred-to as measuring wavelengths correspond to the absorption lines of $N-1$ components of the sample and of which the last wavelength referred-to as the reference wavelength does not correspond to any of said absorption lines, and means for automatic computation from the signal which is delivered by the deomdulating circuit in respect of each stop position of the diffraction grating which defines a measuring wavelength and from the same signal which is delivered when the stop position of the grating defines the reference wavelength and which is stored during each cycle in order to determine the optical density of the sample at said measuring wavelength and the concentration of the component which corresponds to said wavelength wherein the unit for automatically controlling the position of the diffraction grating comprises:

an electric motor for driving said grating in rotation about the center thereof, an angle coder driven by said motor and continuously indicating the angular position of the grating, a system for preselecting N angular stop positions of the grating and signalling the coincidences between the position of the grating as indicated by the coder and each of the N positions which are displayed, each coincidence being signalled by setting one among N flip-flops, a scaler which defines the serial number of the stop positions of the grating and the forward displacement of which is controlled by automatic computation means, a coincidence matrix which delivers at three different outputs a signal for stopping the motor if coincidence occurs between the number displayed by the scaler and the serial number of the set flip-flop, a signal for initiating the movement of rotation of the motor in one direction corresponding to the rotation of the grating in the direction of scanning of wavelengths from position No. 1 to position N if the scaler displays a number other than "one" and if the serial number of the set flip-flop is lower by one unit than the number displayed by said scaler, and a signal for producing the rotation of the motor in the other direction corresponding to rotation of the grating in the direction of direct return from position N to position No. 1 if the scaler displays the digit "one" and if the serial number of the set flip-flop is other than "one,"

and a device for controlling said motor comprising a switch which defines the direction of rotation thereof and to which are connected the three outputs of the coincidence matrix.

2. An analyzer according to claim 1, wherein said preselecting and signalling system comprises N sets of switches which are connected in parallel to the output of the coder and on each of which is displayed a number defining an angular stop position of the diffraction grating, N AND gates each associated with one of the N sets of switches and N flip-flops in series which are each connected to the output of one of said AND gates, said system being such that when coincidence occurs between the number appearing at the output of the coder and one of the N numbers displayed on a set of switches, the logic level 0 appears at the output of the corresponding AND gate, and said level sets the flip-flop which is connected to the output of said gate.

3. An analyzer according to claim 1 and provided in order to take into account the decay in the long-wavelength region of the energy which is emitted by the source with means for automatically changing the amplitude of the input signal of the amplifying system in respect of a predetermined position of the diffraction grating.

4. An analyzer according to claim 3 wherein the means for changing the amplitude of the input signal of the amplifying system in respect of a predetermined position of the diffraction grating comprise:
- a set of switches which is connected to the output of the coder and on which said position is displayed,
- a flip-flop which is turned-on by said set of switches when coincidence occurs between the number which appears at the output of the coder and said displayed position,
- and a relay controlled by the said flip-flop for switching an input-signal divider.

5. An analyzer according to claim 1, wherein said automatic computation means consist of an analog computer.

* * * * *